United States Patent [19]
Elsner et al.

[11] Patent Number: 5,447,713
[45] Date of Patent: Sep. 5, 1995

[54] MOSQUITO COIL AND PROCESS FOR PRODUCING MOSQUITO COILS

[75] Inventors: Thomas Elsner, Düsseldorf; Manfred Schütte, Pulheim; Heinrich Wolfers, Krefeld; Wulf Wendeborn, Rheden, all of Germany

[73] Assignee: Bayer Aktiengesellschaft, Leverkusen, Germany

[21] Appl. No.: 32,873

[22] Filed: Mar. 18, 1993

[30] Foreign Application Priority Data

Mar. 27, 1992 [DE] Germany .................. 42 09 921.8

[51] Int. Cl.⁶ .................. A01N 25/20; B32B 3/10; B32B 29/00; D02G 3/00
[52] U.S. Cl. .................. 424/40; 428/905; 428/906; 428/537.1
[58] Field of Search .................. 514/521, 531, 534, 396; 428/131, 156, 161, 174, 222, 369, 371:537.1; 43/125, 127, 129; 424/40, 285

[56] References Cited

U.S. PATENT DOCUMENTS

| | | | |
|---|---|---|---|
| 4,144,318 | 3/1979 | D'Orazio | 424/40 |
| 4,515,808 | 5/1985 | Elliott et al. | 514/521 |
| 5,055,491 | 10/1991 | Yano et al. | 514/531 |
| 5,091,183 | 2/1992 | Yano et al. | 514/531 |

FOREIGN PATENT DOCUMENTS 0227341  8/1978  Japan .

OTHER PUBLICATIONS

English Translation for Japanese Patent Specification No. 53-27341, 1978.

*Primary Examiner*—George F. Lesmes
*Assistant Examiner*—Kathryne E. Shelborne
*Attorney, Agent, or Firm*—William C. Gerstenzang; Sprung Horn Kramer & Woods

[57] ABSTRACT

Mosquito coils are resistant to breakage, light, flat and ensure a good active substance yield if they consist of a wood-chip and/or fiber material of a density of only 0.4 to 0.7 kg/dm³ and preferably have a thickness of 1 to 4.5 mm, the active substance being applied to the spiral (1) as a layer (2).

6 Claims, 1 Drawing Sheet

MOSQUITO COIL AND PROCESS FOR PRODUCING MOSQUITO COILS

The invention relates to a mosquito coil in the form of a spiral which is punched out from a board consisting of wood-chip and/or wood-fibre material and is provided with an active substance, and to a process for producing mosquito coils, in which process wood chips and/or wood fibres are pressed, with binders if appropriate, to form boards and the coils are punched out therefrom.

It is known (JP 7 8027-341) to produce boards of 4 to 6 mm thickness from a doughy composition of fibrous waste, such as rayon waste, cotton waste, waste paper or else wood fibres and mineral fibres, binders and active substance as well as, if appropriate, further additives, to dry them and punch out coils therefrom. Such a board material has in the dried state the relatively high density of at least 0.8 kg/dm$^3$. The flexural load-bearing capacity of the coils punched out therefrom is low, so that breakage readily occurs during handling. Owing to the high density, the boards dry only slowly and often warp during drying. The high material density also makes the product expensive. The high density also causes problems during punching-out of the coils, because the cutting edge of the spiral punching cutter is often bent, so that an unclean cut is produced and the coil jams between the turns of the punching cutter because the restoring force of an insert of flexible foam, serving as ejector, is no longer adequate.

Since the active substance is distributed uniformly in the composition, during burning of the coil only about half the active substance is released into the open, whereas the remainder oxidises beforehand and becomes ineffective in an undesired way.

The object is to provide a mosquito coil which is more resistant to breakage, is lighter and flat, ensures a higher efficiency of the active substance and can be produced without any problems.

This object is surprisingly achieved by the density of the material of this spiral being 0.4 to 0.7 kg/dm$^3$ and by the spiral being coated with the active substance.

Figure 1:
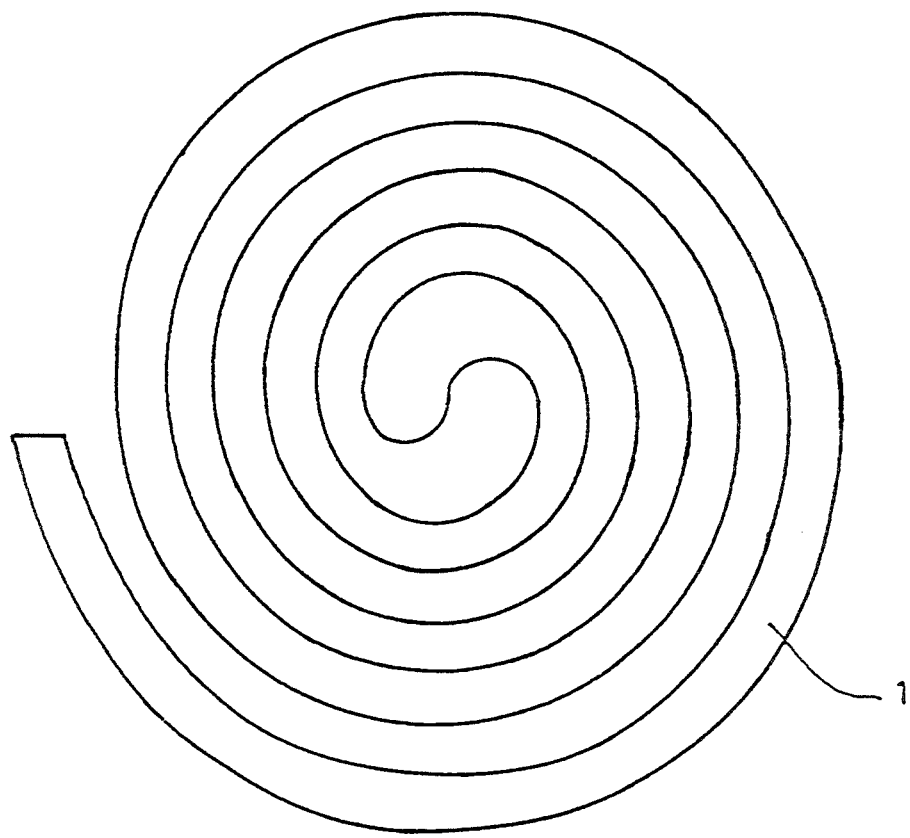
FIG. 1 is a front view of the mosquito coil according to the claimed invention.

This density is in relation to the dry state. It has been shown that this lighter coil has greater toughness on account of the lower density and is therefore less susceptible to breakage. The lower density has no influence on the burning duration, which is adjusted by the addition of oxidising auxiliaries, such as for example potassium nitrate. Since the active substance is only applied to the coil as a coating, it becomes effective without loss when the coil is burned. The lower density is also of advantage for the punching operation, because less force has to be exerted and, as a result, damage to the punching cutter is avoided. Consequently, the risk of the coil Jamming between the turns of the punching cutter is also minimised. Since the coils are flat, i.e. do not warp, they can also be easily packed by machine. In an advantageous way, the cheaper and more widely available soft-wood waste can be processed. The addition of binders is required only if wood chips are used. Wood fibres can also be pressed without binders. The coil usually has a round shape. However, square or oval shapes are also possible.

The average length of the wood chips is preferably between 2 and 10 mm, the width between 0.5 and 3 mm and the thickness between 0.1 and 2 mm.

The average length of the wood fibres is preferably between 3 and 15 mm and their average thickness between 0.02 and 0.5 mm.

It goes without saying that such materials always have a broad range of dimensions, but the majority of the wood chips or wood fibres should have dimensions within the specified limits because this has proved to be particularly advantageous for the properties of the coil.

Mixtures of wood chips and wood fibres of the above-mentioned dimensions are also possible for the production of the coil.

The thickness of the coil is preferably from 1 to 4.5 mm, in particular to 4 mm.

It has been surprisingly shown that this small thickness is completely adequate and that, in particular in combination with the lower density of this material, 0it brings about a greater flexibility of the spiral.

The novel process for producing mosquito coils is based on wood chips and/or fibres, if appropriate also with the addition of binders, which are pressed to form-boards and the coils are punched therefrom.

The novel process is to be seen in that pressures are applied by which boards which in the dried state have a density of 0.4 to 0.7 kg/dm$^3$ are produced, and that the coils are coated with the active substance after punching out or in a way covering the full surface before punching, depending on the format of the coil.

The low density assists the punching operation, because less forces are necessary. Since the risk of the cutting edge of the punching cutter bending is eliminated, no jamming of the coils between the turns of the punching-cutter occurs any longer. The fibres and/or wood chips may be pressed both by the dry method and by the wet method. Additives are usually added to the composition to be pressed.

The coating of the punched-out coils with the active substance does not present any difficulties.

This coating is preferably performed by means of rollers.

Such a method of application is very environmentally friendly and substantially loss-free.

The novel coil in round shape is explained in more detail below and represented purely diagrammatically in an exemplary embodiment in the drawing, in which:

FIG. 1 shows a plan view and

Figure 2:
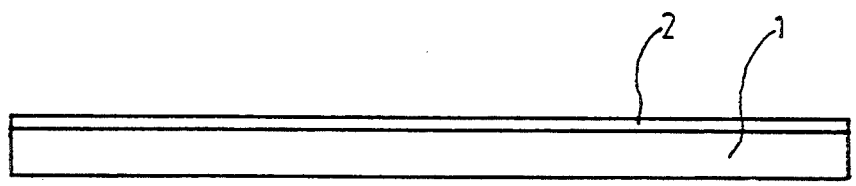
FIG. 2 is a side view of the mosquito coil according to the claimed invention.

FIG. 2 shows a side view.

The density of the material of the coil is 0.5 kg/dm$^3$. The material comprises a mixture of 20% by weight wood chips of an average size of $3 \times 1 \times 0.5$ mm and 79.5% by weight wood fibres of an average length of 5 mm and an average thickness of 0.3 mm as well as 0.5% by weight additives (oxidising agent, dyes), in relation to the dry starting composition. In the same way, however, coils can be produced particularly advantageously from 99.5% wood-fibre material. The coil has the shape of a spiral 1, which is coated on one side with a layer 2 of active substance, shown enlarged.

We claim:

1. A mosquito coil consisting essentially of
   (1) a spiral punched out from a board consisting of wood chips and/or wood-fiber material, the density of the spiral ranging from 0.4 to 0.7 kg/dm$^3$, and (2) a coating on the spiral consisting essentially of an active substance toxic to mosquitos.

2. Mosquito coil according to claim 1, characterised in that the average size of the wood chips is between 2×0.5×0.1 mm and 10×3×2 mm.

3. Mosquito coil according to claim 1, characterised in that the average length of the wood fibres is between 3 and 15 mm and their average thickness is between 0.02 and 0.5 mm.

4. Mosquito coil according to claim 1, characterised in that the thickness of the coil (1) is up to 4.5 min.

5. A mosquito coil consisting essentially of
(1) a spiral punched out from a board consisting of wood-fiber material, the density of the spiral ranging from 0.4 to 0.7 $kg/dm^3$, and
(2) a coating on the spiral consisting essentially of an active substance toxic to mosquitos.

6. A mosquito coil consisting essentially of
(1) a spiral punched out from a board consisting of wood-chips material and binder and, optionally other, additives, the density of the spiral ranging from 0.4 to 0.7 $kg/dm^3$, and
(2) a coating on the spiral consisting essentially of an active substance toxic to mosquitos.

* * * * *

UNITED STATES PATENT AND TRADEMARK OFFICE
CERTIFICATE OF CORRECTION

PATENT NO. : 5,447,713
DATED : September 5, 1995
INVENTOR(S) : Elsner, et al.

It is certified that error appears in the above-indentified patent and that said Letters Patent is hereby corrected as shown below:

Col. 3, claim 4 line 2    Delete " min " and substitute -- mm --

Signed and Sealed this

Second Day of January, 1996

*Attest:*

BRUCE LEHMAN

*Attesting Officer*    *Commissioner of Patents and Trademarks*